United States Patent
Voloshinov et al.

(10) Patent No.: US 12,126,710 B2
(45) Date of Patent: Oct. 22, 2024

(54) METHOD FOR DETERMINING A CRYPTOGRAPHIC KEY, COMPUTER PROGRAM, AND DATA PROCESSING SYSTEM

(71) Applicant: Terra Quantum AG, St. Gallen (CH)

(72) Inventors: Vladimir Voloshinov, St. Gallen (CH); Gordey Lesovik, St. Gallen (CH); Aleksei Pakhomchik, St. Gallen (CH)

(73) Assignee: Terra Quantum AG, St. Gallen (CH)

( * ) Notice: Subject to any disclaimer, the term of this patent is extended or adjusted under 35 U.S.C. 154(b) by 237 days.

(21) Appl. No.: 17/854,493

(22) Filed: Jun. 30, 2022

(65) Prior Publication Data
US 2023/0027694 A1 Jan. 26, 2023

(30) Foreign Application Priority Data
Jul. 5, 2021 (EP) .................................... 21183810

(51) Int. Cl.
*H04L 9/06* (2006.01)
*G06N 10/60* (2022.01)

(52) U.S. Cl.
CPC ........... *H04L 9/0631* (2013.01); *G06N 10/60* (2022.01); *H04L 9/0625* (2013.01)

(58) Field of Classification Search
CPC ...... H04L 9/0631; H04L 9/0625; G06N 10/60
(Continued)

(56) References Cited

U.S. PATENT DOCUMENTS

| 2013/0251144 A1* | 9/2013 | Hiwatari | H04L 9/0625 380/28 |
| 2013/0315387 A1* | 11/2013 | Huang | H04L 9/0637 380/28 |

(Continued)

FOREIGN PATENT DOCUMENTS

| JP | 2017-515195 A | 6/2017 |
| JP | 2019-041166 A | 3/2019 |
| JP | 2020-119548 A | 8/2020 |

OTHER PUBLICATIONS

Abdelkhalek et al., "MILP Modeling for (Large) S-boxes to Optimize Probability of Differential Characteristics," *IACR Transactions on Symmetric Cryptology*, 2017(4): 99-129 (2017).

(Continued)

*Primary Examiner* — Thanh T Le
(74) *Attorney, Agent, or Firm* — Leydig, Voit & Mayer, Ltd.

(57) ABSTRACT

A method for determining a cryptographic key is carried out in a data processing system, and comprises: providing a plaintext and a ciphertext determined from the plaintext using a cryptographic key and a cryptographic procedure which comprises cryptographic operations; for each cryptographic operation of the cryptographic procedure, providing at least one intermediate relation which comprises an intermediate equation and/or an intermediate inequality; determining an optimization problem comprising: the plaintext and the ciphertext; at least one optimization expression assigned to a round of the cryptographic procedure; and optimization variables comprising state variables of the cryptographic procedure and a cryptographic key variable; wherein the at least one optimization expression is determined from the at least one intermediate relation and comprises at least one preceding state variable assigned to a preceding round. The method further comprises: solving the (Continued)

optimization problem and determining the cryptographic key from an optimizing value of the cryptographic key variable.

14 Claims, 6 Drawing Sheets

(58) Field of Classification Search
USPC .......................................................... 713/189
See application file for complete search history.

(56) References Cited

U.S. PATENT DOCUMENTS

| | | | |
|---|---|---|---|
| 2014/0348323 A1* | 11/2014 | Chevallier-Mames | ...................... H04L 9/0631 380/28 |
| 2016/0112188 A1* | 4/2016 | Choi | ........................ G09C 1/00 380/28 |
| 2018/0089467 A1* | 3/2018 | Pedersen | ............... H04L 9/0631 |
| 2020/0027029 A1 | 1/2020 | Linvill | |
| 2020/0394547 A1 | 12/2020 | Cao et al. | |
| 2023/0206102 A1* | 6/2023 | Raussendorf | .......... G06N 10/60 706/62 |
| 2023/0259638 A1* | 8/2023 | Yang | ..................... G06F 21/755 726/26 |

OTHER PUBLICATIONS

Burek et al., "Algebraic attacks on block ciphers using quantum annealing," *IACR, International Association for Cryptologic Research*, 20210517(062724): 1-13 (2012).

Nikolić, "How to Use Metaheuristics for Design of Symmetric-Key Primitives," *IACR, International Association for Cryptologic Research*, 20171220(124009): 1-24 (2017).

European Patent Office, Extended European Search Report in European Patent Application No. 21183810.7 (Nov. 24, 2021).

* cited by examiner

METHOD FOR DETERMINING A CRYPTOGRAPHIC KEY, COMPUTER PROGRAM, AND DATA PROCESSING SYSTEM

TECHNICAL FIELD

The present disclosure relates to techniques for determining a cryptographic key, in particular on a quantum computer, such as a quantum annealing device.

BACKGROUND

In symmetric-key cryptography algorithms, the same cryptographic key is used for both encrypting input data (plaintext) to encrypted data (ciphertext), and decrypting the ciphertext back to the plaintext. A prominent symmetric key algorithm is AES (Advanced Encryption Standard). It is in general a computationally hard problem to determine the cryptographic key used for creating the ciphertext from the plaintext, even if both the ciphertext and the plaintext are known.

SUMMARY

It is an object of the present disclosure to provide a method for determining a cryptographic key in an efficient and resource-conserving manner.

For solving the problem, a method for determining a cryptographic key according to independent claim 1 is provided. Further, a computer program and a data processing system are provided. Further embodiments are disclosed in dependent claims.

According to one aspect, a method for determining a cryptographic key, carried out in a data processing system, is provided. The method comprises providing a plaintext and a ciphertext determined from the plaintext using a cryptographic key and a cryptographic procedure which comprises cryptographic operations; for each cryptographic operation of the cryptographic procedure, providing at least one intermediate relation which comprises an intermediate equation and/or an intermediate inequality; determining an optimization problem comprising the plaintext and the ciphertext, at least one optimization expression assigned to a round of the cryptographic procedure, and optimization variables comprising state variables of the cryptographic procedure and a cryptographic key variable, wherein the at least one optimization expression is determined from the at least one intermediate relation and comprises at least one preceding state variable assigned to a preceding round. The method further comprises solving the optimization problem and determining the cryptographic key from an optimizing value of the cryptographic key variable.

According to another aspect, a computer program and/or a computer program product is provided comprising instructions which, when the computer program and/or the computer program product is carried out in a data processing system, cause the data processing system to perform the steps of the method for determining a cryptographic key.

According to a further aspect, a data processing system is provided which is configured to determine a cryptographic key by performing the following steps: providing a plaintext and a ciphertext determined from the plaintext using a cryptographic key and a cryptographic procedure which comprises cryptographic operations; for each cryptographic operation of the cryptographic procedure, providing at least one intermediate relation which comprises an intermediate equation and/or an intermediate inequality; determining an optimization problem comprising the plaintext and the ciphertext, and further comprising at least one optimization expression assigned to a round of the cryptographic procedure, and optimization variables comprising state variables of the cryptographic procedure and a cryptographic key variable, wherein the at least one optimization expression is determined from the at least one intermediate relation and comprises at least one preceding state variable assigned to a preceding round; and solving the optimization problem and determining the cryptographic key from an optimizing value of the cryptographic key variable.

The proposed method allows for examining and/or validating the cryptographic strength of a number of state-of-the-art cryptographic algorithms which are described in terms of Boolean functions on binary variables, notably, symmetric encryption algorithms such as DES, 3DES, AES-*, and ARX-based ciphers. Further, the problems of determining secret keys of symmetric ciphers based on pairs of plain text and cipher text may be transformed to appropriate mixed-integer linear programming (MILP) problems or quadratic unconstrained binary optimization (QUBO) problems. Such QUBO problems may in principle be solved using quantum annealing devices with substantial computational speedup. The representation of any Boolean function on binary variables either as a linear equation (with the same variables and binary ancillaries) or as a system of linear inequalities (with the same binary variables without binary ancillaries) may be applied in a wide range of discrete optimization systems as a sub-system of automatic generation of linear constraints.

The cryptographic procedure may be described in terms of Boolean functions on binary variables. The cryptographic procedure may be one of AES, IDEA, Salsa20, DES, 3-DES, and an ARX (AND-ROTATE-XOR) procedure.

In particular, the cryptographic procedure may be one of AES-128, AES-192, and AES-256. The cryptographic procedure may comprise cryptographic operations which may be decomposable into elementary operations consisting of AND, OR, XOR, NOR, and NAND. The ARX procedure may comprise only AND, ROTATE, and XOR operations. In general, the provided method does not require a decomposition and may be applied to a cryptographic procedure which uses an arbitrary Boolean function on binary variables.

The cryptographic operations may comprise AES operations, preferably at least one of AddRoundKey, SubBytes, ShiftRows, MixColumns, and KeyExpansion. In particular, each of the cryptographic operations may be one of AddRoundKey, SubBytes, ShiftRows, MixColumns, and KeyExpansion.

The cryptographic operations may comprise sub-operations such as an inverse operation in a finite field, or a multiplication with an integer greater than one (e.g., 2 or 3) in the finite field, preferably in GF ($2^8$).

The method may further comprise determining an elementary operation of at least one of the cryptographic operations; from the elementary operation, determining an elementary relation, comprising an elementary equation and/or an elementary inequality; and determining at least one intermediate relation from the elementary relation. Preferably, the elementary operation is at least one of NOT, AND, OR, and XOR. Generally, the elementary operation may be a Boolean function acting on one or two binary variables. The elementary relation and/or a system of elementary relations may correspond to a Boolean function acting on one or two binary variables.

A plurality of elementary operations may be determined. From each of the plurality of elementary operations, a corresponding elementary relation of a plurality of elementary relations may be determined. A plurality of intermediate relations may be determined from the plurality of elementary relations.

At least one elementary relation may be determined by solving an elementary optimization problem, preferably an unconstrained quadratic problem. The unconstrained quadratic problem may be adapted to be solved in a quantum annealing device.

In particular, each of the elementary relations may be determined by solving a respective elementary optimization problem, preferably a respective constrained quadratic problem.

At least one of the elementary relations may comprise a bilinear equation and/or a linear equation, which may preferably comprise at least one of continuous variables, binary variables, and integer variables.

In particular, at least one of the elementary relations may have the form $\vec{c}_x^T \vec{x} + \vec{c}_a^T \vec{a}_x = b$, wherein the binary variables and/or integer variables comprise $\vec{a}_x$ and $\vec{x} = (\vec{y}, q(\vec{y}))$, and the continuous variables comprise b, $\vec{c}_x$, and $\vec{c}_a$, wherein q is one of the elementary operations.

By solving the elementary optimization problem, at least one of the continuous and/or binary variables may be determined. In particular, the variables $\vec{a}_x$, b, $\vec{c}$ and $\vec{e}$ may be determined by solving the elementary optimization problem. The elementary optimization problem may comprise an elementary objective function of the form $(c_1 - 1)^2$, wherein $c_1$ may preferably be the first component of the variable $\vec{c}$. The elementary optimization problem may comprise auxiliary constraints comprising at least one of $\vec{c}^T \vec{x} + \vec{e}^T \vec{a} = b$ and $\vec{c}^T \vec{x} + \vec{e}^T \vec{a} \neq b$.

At least one intermediate relation (in particular one intermediate equation) may be provided by solving an intermediate optimization problem. Additionally or alternatively, the at least one intermediate relation may correspond to a Boolean function with more than one elementary operation. Further, at least one system of intermediate relations may correspond to a Boolean function with more than one elementary operation.

At least one intermediate relation may also correspond to an elementary operation.

The intermediate optimization problem may preferably be a constrained quadratic problem.

At least one intermediate relation may comprise a permutation function. Each intermediate equation may comprise binary variables and/or continuous variables. Each intermediate inequality may also comprise binary variables and/or continuous variables.

At least one intermediate relation may be provided by determining an H-representation of a convex polyhedron for one of the cryptographic operations. In particular, a system of intermediate inequalities may be provided by determining the H-representation of the convex polyhedron for one of the cryptographic operations.

The system of intermediate inequalities may be determined such as being irreducible.

The convex polyhedron may be determined from a Boolean function of the respective cryptographic operation. The convex polyhedron may be representable by its vertices (V-representation) or by its facets (H-representation). The H-representation may be determined via a polyhedral computation code, particularly via CDD or LRS.

At least one intermediate relation may also be provided by determining a conjunctive normal form or a disjunctive normal form of the Boolean function of the respective cryptographic operation. Preferably, the intermediate relation may then be determined from the elementary relations corresponding to the terms in the conjunctive normal form or the disjunctive normal form.

At least one intermediate relation may be provided by determining, for one of the cryptographic operations acting on a finite field, a further operation acting on a further finite field of lower order. Further, the at least one intermediate relation may be provided by determining, for a sub-operation of the cryptographic operation acting on a finite field, a further sub-operation and/or elementary operation acting on a further finite field of lower order.

In particular, if the cryptographic operation and/or sub-operation acts on $GF(2^8)$, the further operation, sub-operation and/or elementary operation may act on $GF(2^4)$. If the cryptographic operation and/or sub-operation acts on $GF(2^4)$, the further operation, sub-operation and/or elementary operation may act on $GF(2^2)$. If the cryptographic operation and/or sub-operation acts on $GF(2^2)$, the further operation, sub-operation and/or elementary operation may act on $GF(2)$.

The optimization problem may be a mixed-integer linear program, a mixed-integer nonlinear program, or a quadratic unconstrained binary optimization problem. The optimization problem may also be a constrained integer program.

During optimization, an optimizing set of optimizing values for the optimization variables is searched within a search space. The optimization problem may comprise a discrete search space. The optimizing set may correspond to a minimum, preferably a global minimum, of the optimization problem.

The optimization expression may be an optimization constraint or may be contained in an objective function of the optimization problem.

The optimization constraint may be an equation or an inequality, in particular one of the intermediate equations or intermediate inequalities. The optimization constraint may also be a rearranged intermediate equation or intermediate inequality. A plurality of optimization expressions or a plurality of optimization constraints may also be determined by reducing a linear system of intermediate equations or a system of intermediate inequalities.

The objective function of the optimization problem may consist of a sum of squared optimization expressions.

The plaintext may comprise a first plaintext and a second plaintext and the ciphertext may comprise a first ciphertext and a second ciphertext. The first ciphertext may have been determined from the first plaintext using the cryptographic key and the cryptographic procedure, and the second ciphertext may have been determined from the second plaintext using the (same) cryptographic key and the cryptographic procedure.

For example, the cryptographic key may have a length of 192 bits or 256 bits, and the first and the second plaintext may each have a length of 128 bits.

For the first plaintext and the first ciphertext, a first plurality of intermediate relations may be determined. Further, for the second plaintext and the second ciphertext, a second plurality of intermediate relations may be determined. The optimization problem may be determined from both the first and the second plurality of intermediate relations.

The optimization problem may at least partially be solved in a quantum processing device of the data processing system, preferably a quantum annealing device.

For example, the quantum annealing device may comprise a D-Wave annealing device.

The optimization problem may also be solved at least partially on a universal quantum computer. To this end, a quantum approximate optimization algorithm may be employed to solve the optimization problem.

Alternatively, the optimization problem may be solved only in one or a plurality of classical processing devices of the data processing system. The classical processing devices may each comprise a processor and a memory.

Determining the elementary relations, determining the intermediate relations, determining the optimization problem, and/or determining the cryptographic key from an optimizing value of the cryptographic key variable may be carried out in the classical data processing device(s), in particular by the corresponding processor(s).

The data processing system may comprise the quantum processing device, in particular the quantum annealing device. Alternatively, the quantum processing device may be separated from the data processing system.

At least one of the optimization constraints, preferably all of the optimization constraints, may be transferred to the quantum processing device, preferably from the classical processing device(s), in particular the memory/memories of the classical processing device(s). Transferring the optimization constraints may comprise transferring fixed values during optimization.

The optimization variables may be assigned to a superposition of quantum states.

In particular, each possible value allocation of the optimization variables may correspond to one of the quantum states, preferably generated in the quantum processing device. At an initial time, each of the quantum states of the superposition may have the same weight.

The superposition may be evolved in time by the quantum processing device according to a prescription determined from the constraints. The prescription may for example be represented by a Hamiltonian.

The optimizing value of the cryptographic key variable may be determined from the superposition at a final time. At the final time, an optimizing quantum state of the quantum states, corresponding to the optimizing set, may have the largest weight of the quantum states of the superposition. The optimizing quantum state may for example correspond to a ground state of the Hamiltonian.

The optimizing value of the cryptographic key variable may be determined by determining the optimizing quantum state. The optimizing value may be transferred to the classical data processing device(s). With this, the cryptographic key may be provided in the classical data processing device(s), in particular in the memory/memories of the classical processing device(s).

The aforementioned embodiments related to the method for determining a cryptographic key may be provided correspondingly for the data processing system configured to determine a cryptographic key.

DESCRIPTION OF FURTHER EMBODIMENTS

In the following, embodiments, by way of example, are described with reference to figures.

Figure 1:
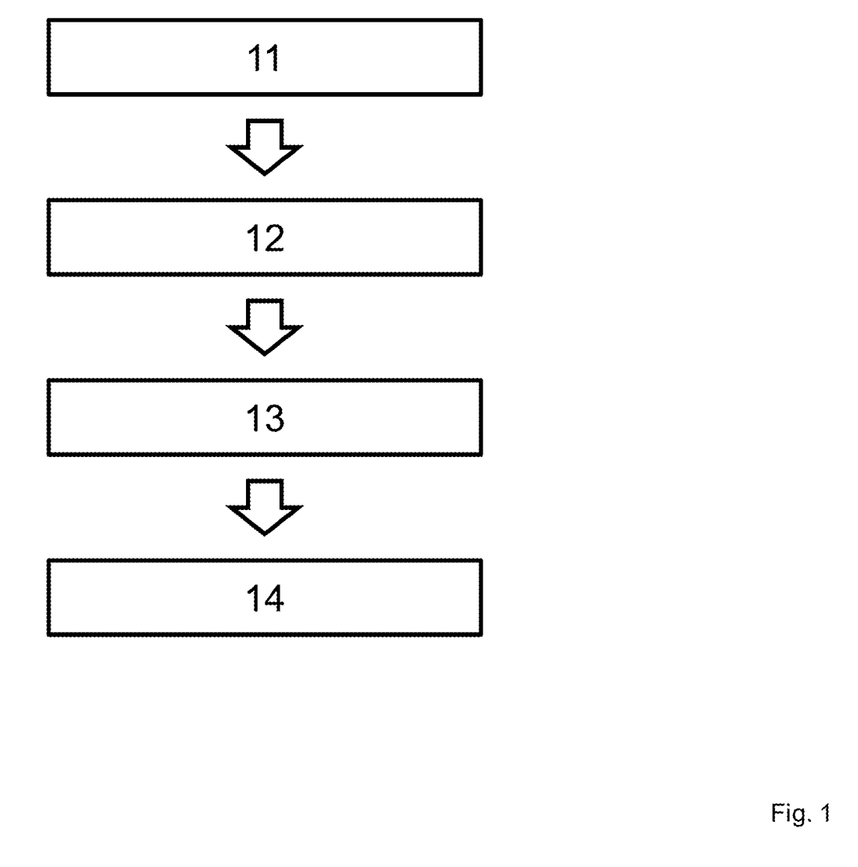
FIG. 1 shows a graphical representation of a method for determining a cryptographic key.

In FIG. 1, a graphical representation of the (computer-implemented) method for determining a cryptographic key is shown. In a first step 11, a plaintext and a ciphertext by encrypting the plaintext using a cryptographic procedure are provided.

In a second step 12, at least one intermediate relation is provided for each cryptographic operation of the cryptographic procedure. In case of the cryptographic procedure being AES, the cryptographic operations are AddRoundKey, SubBytes, Shiftows, MixColumns, and KeyExpansion. Each intermediate relation can be an intermediate equation, or alternatively, an intermediate inequality. The intermediate equations can be determined by solving elementary optimization problems.

In a third step 13, after providing, in particular determining, the intermediate relations, an optimization problem such as a mixed-integer linear programming problem (MILP) or a quadratic unconstrained binary optimization (QUBO) problem is determined.

The optimization problem comprises a plurality of optimization expressions established from the intermediate relations and assigned to each round of the cryptographic procedure. An optimization expression can be an optimization constraint, in particular of a MILP. Alternatively, the optimization expression is contained in a summand of the objective function of the optimization problem, in particular of a QUBO problem.

The optimization problem further comprises the state variables of the cryptographic procedure. A plurality of optimization expressions assigned to a certain round each comprise at least one state variable assigned to a preceding round.

After determining the optimization problem, the optimization problem is solved, and the cryptographic key is determined from an optimizing set of optimization variables (optimizer) of the optimization problem, in particular from an optimizing value of the cryptographic key variable (fourth step 14).

Figure 2:
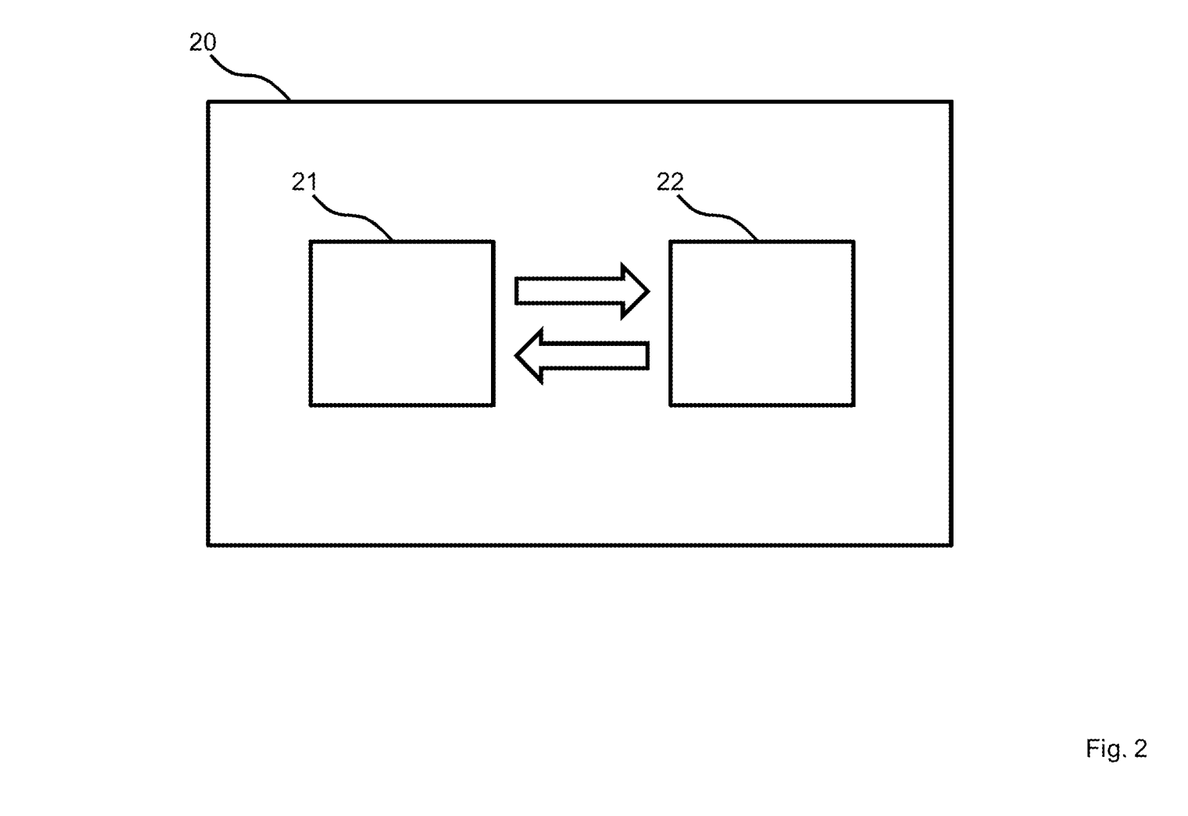
FIG. 2 shows a graphical representation of a data processing system.

FIG. 2 shows a graphical representation of a data processing system 20. The data processing system 20 comprises at least one classical processing device 21. Additionally, the data processing system 20 may comprise a quantum processing device 22, for example a quantum annealing device. Data may be exchanged between the at least one classical processing device 21 and the quantum processing device 22.

In particular, in case of employing a D-Wave quantum annealing device, a D-Wave Python API may be used for data exchange.

Steps 11 to 13 are preferably carried in out in the classical processing device 21. The fourth step 14 of solving the optimization problem may be carried out in the classical processing device 21 or the quantum processing device 22. In the latter case, the fourth step 14 is significantly accelerated.

DETAILED DESCRIPTION OF THE METHOD

In the following, the steps of the method are laid out in detail with particular reference to AES.

a. AES Structure

In AES, the cryptographic key may have one of three different sizes, namely 128, 192, and 256 bits, while the input, the plaintext, has a fixed block size of 128 bits. For larger input data to be encrypted, the input data is split into data blocks of 128 bits each and the AES algorithm is applied to each data block, making use of a block cipher mode of operation.

Depending on the cryptographic key size, AES comprises a different number of rounds/iterations in which cryptographic operations are successively carried out, namely 10, 12, or 14—respectively corresponding to 128, 192, or 256 bits.

AES acts on 4×4 data blocks/arrays. In the AES regime, these data blocks are called states, each comprising in total 16 state entries (bytes). For instance, the plaintext b with 128 bits or equivalently 16 bytes $b_0, b_1, \ldots, b_{15}$ is represented by the two-dimensional array $$\begin{bmatrix} b_0 & b_4 & b_8 & b_{12} \\ b_1 & b_5 & b_9 & b_{13} \\ b_2 & b_6 & b_{10} & b_{14} \\ b_3 & b_7 & b_{11} & b_{15} \end{bmatrix}. \quad (1)$$

AES Comprises the Following Cryptographic Operations:
I. KeyExpansion—round keys are derived from the cryptographic key using an AES key schedule. AES requires a separate 128-bit round key block for each round plus an additional round key block.
II. Key addition round:
   a. AddRoundKey—each state entry is combined with a byte of the round key using bitwise XOR.
III. Subsequent rounds (9, 11, or 13 rounds):
   a. SubBytes—a non-linear substitution step in which each byte is replaced with another according to a lookup table.
   b. ShiftRows—a transposition step in which the last three rows of the state are shifted cyclically by a certain number of steps.
   c. MixColumns—a linear mixing operation which operates on the columns of the state, combining the four bytes in each column.
   d. AddRoundKey
IV. Final round:
   a. SubBytes
   b. ShiftRows
   c. AddRoundKey The final state corresponds to the ciphertext.

Within the context of the present disclosure, the KeyExpansion operation can be understood as being contained in an initial round.

a. Determining the Elementary Relations

The cryptographic operations comprise Boolean functions with binary variables. For example, the cryptographic operation SubBytes comprises successively applying XOR operations. In the method, intermediate relations are determined for each cryptographic operation based on the Boolean functions. The intermediate relations may correspond to (intermediate) equations (equation representation) or to systems of (intermediate) inequalities (inequality representation).

Each Boolean function of a cryptographic operation can be further divided into elementary operations such as $x \wedge y$, $x \vee y$, or $x \oplus y$ (AND, OR, XOR). For each elementary operation, at least one elementary relation, i.e., an elementary equation or an elementary inequality, can be determined. From the established elementary relations, the intermediate relations can be determined. In the following, determining the elementary relations will be illustrated before treating the intermediate relations in the subsequent section.

In order to determine a linear equation corresponding to an elementary operation, a respective (elementary) optimization problem is solved. The vector $\vec{x}$ is defined as joint vector $\vec{x}=(\vec{y}, q(\vec{y}))$ for elementary operation q, set of input variables $\vec{y}$, and output $q(\vec{y})$. Further, f denotes a set of feasible configurations. The elementary equation to be determined has the form $$\vec{c}^T\vec{x} + \vec{e}^T\vec{a} = b, \quad (2)$$

wherein $\vec{a}$ is an auxiliary vector of binary coefficients, b is a continuous coefficient, $\vec{c}, \vec{e}$ are vectors of continuous coefficients, and $\vec{x}=(\vec{y}, q(\vec{y}))$ is a vector of binary variables. The transpose of a vector is denoted with $(\cdot)^T$. Notably, Eq. (2) is linear in $\vec{c}$.

The Linear System Must Satisfy:

$$\begin{cases} \vec{c}^T\vec{x} + \vec{e}^T\vec{a}_x = b(\forall x \in f) \\ \vec{c}^T\vec{x} + \vec{e}^T\vec{a} \neq b(\forall x \notin f \forall \vec{a} \in \{0,1\}^{N_a}) \end{cases} \quad (3)$$

The sought-after coefficients to be determined by the elementary optimization problem are the continuous variables c, e, and b. The elementary optimization problem can be formulated as a MILP and is determined from Eq. (3) as follows. First, a number $N_a$ of ancillaries $\vec{a}$ in Eq. (3) is chosen. The number of variables in the original problem is denoted by $N_x$. The MILP consists of a set of auxiliary constraints and an objective function. Each vector from the feasible configurations yields one of the auxiliary constraints with continuous variables $\vec{c}, \vec{e}$, and b and $N_a$ new binary variables $\vec{a}$:

$$\vec{c}^T\vec{x} + \vec{e}^T\vec{a} = b \quad (4)$$

For each vector $\vec{x}$ from the infeasible configurations, $2^{N_a}$ new of the auxiliary constraints are added:

$$\forall \vec{a} \in \{0,1\}^{N_a}: \vec{c}^T\vec{x} + \vec{e}^T\vec{a} \neq b \quad (5)$$

As a result, a MILP with $|f|+2^{N_a}|f^*|$ auxiliary constraints ($|f|$ and $|f^*|$ being the number of the feasible and the infeasible configurations, respectively) and $N_x+N_a+1+|f|\cdot N_a$ variables is established. Such a homogeneous MILP has a plurality of solutions (multiplying all coefficients by the same number also results in a solution). Hence, the first coefficient $c_1$ of $\vec{c}$ is set to 1, yielding the additional auxiliary constraint or corresponding penalty term $c_1=1$.

The Elementary Optimization Problem then Reads:

$$\min_{\vec{a}_x, b, \vec{c}, \vec{e}} (c_1-1)^2 \text{ subject to } \begin{cases} \vec{c}^T\vec{x} + \vec{e}^T\vec{a}_x = b(\forall x \in f) \\ \vec{c}^T\vec{x} + \vec{e}^T\vec{a} \neq b(\forall x \notin f \forall \vec{a} \in \{0,1\}^{N_a}) \end{cases} \quad (6)$$

with b, $\vec{c}, \vec{e}$ comprising real-valued variables and $\vec{a}_x$ comprising binary variables.

As an example, determining the elementary equation for the elementary operation $z = x \wedge y$ is described below.

The feasible configurations and the infeasible configurations of the elementary operation are as follows:

| x | y | z | |
|---|---|---|---|
| 0 | 0 | 0 | feasible |
| 0 | 1 | 0 | feasible |
| 1 | 0 | 0 | feasible |
| 1 | 1 | 1 | feasible |
| 0 | 0 | 1 | infeasible |
| 0 | 1 | 1 | infeasible |
| 1 | 0 | 1 | infeasible |
| 1 | 1 | 0 | infeasible |

Eq. (4) is simplified to $c_x x + c_y y + c_z z + c_a a = b$ and the coefficients $c_x$, $c_y$, $c_z$, $c_a$, $b$ are to be determined such that:

$$z = x \wedge y \Leftrightarrow (\exists \alpha \in \{0,1\} : c_x x + c_y y + c_z z + c_a a = b). \quad (7)$$

The elementary optimization problem then reads $$\min_{c_x, c_y, c_z, c_a, b, a_0, a_1, a_2, a_3} (c_x - 1)^2$$

subject to:

$c_x \cdot 0 + c_y \cdot 0 + c_z \cdot 0 + c_a a_0 = b,$ $c_x \cdot 0 + c_y \cdot 1 + c_z \cdot 0 + c_a a_1 = b,$ $c_x \cdot 1 + c_y \cdot 0 + c_z \cdot 0 + c_a a_2 = b,$ $c_x \cdot 1 + c_y \cdot 1 + c_z \cdot 1 + c_a a_3 = b,$ $c_x \cdot 0 + c_y \cdot 0 + c_z \cdot 1 + c_a \cdot 0 \neq b,$ $c_x \cdot 0 + c_y \cdot 0 + c_z \cdot 1 + c_a \cdot 1 \neq b,$ $c_x \cdot 0 + c_y \cdot 1 + c_z \cdot 1 + c_a \cdot 0 \neq b,$ $c_x \cdot 0 + c_y \cdot 1 + c_z \cdot 1 + c_a \cdot 1 \neq b,$ $c_x \cdot 1 + c_y \cdot 0 + c_z \cdot 1 + c_a \cdot 0 \neq b,$ $c_x \cdot 1 + c_y \cdot 0 + c_z \cdot 1 + c_a \cdot 1 \neq b,$ $c_x \cdot 1 + c_y \cdot 1 + c_z \cdot 0 + c_a \cdot 0 \neq b,$ $c_x \cdot 1 + c_y \cdot 1 + c_z \cdot 0 + c_a \cdot 1 \neq b,$ $$c_x, c_y, c_z, c_{(a)}, b \in \mathbb{R}, a_0, a_1, a_2, a_3 \in \{0,1\}. \quad (8)$$

Analogously, the elementary equations for further Boolean elementary operations can be determined, yielding the following Table 1:

TABLE 1

| Elementary operation | | Elementary equation |
|---|---|---|
| AND | $x \wedge y = z$ | $E_\wedge(x, y, a, z) \doteq \{x + y - 2z - a = 0\}$ |
| OR | $x \vee y = z$ | $E_\vee(x, y, a, z) \doteq \{x + y - 2z + a = 0\}$ |
| XOR | $x \oplus y = z$ | $E_\oplus(x, y, a, z) \doteq \{x + y - z - 2a = 0\}$ |
| NOR | $\overline{x \vee y} = z$ | $E_{\overline{\vee}}(x, y, a, z) \doteq \{x + y + 2z - a = 1\}$ |
| NAND | $\overline{x \wedge y} = z$ | $E_{\overline{\wedge}}(x, y, a, z) \doteq \{x + y + 2z - a = 2\}$ |

Instead of elementary equations, systems of elementary inequalities can be established for each elementary operation, according to Table 2:

TABLE 2

| | El. operation | Systems of elementary inequalities |
|---|---|---|
| AND | $x \wedge y = z$ | $S_\wedge(x, y, z) \doteq \{z \leq x, z \leq y, z \geq x + y - 1, z \geq 0\}$ |
| OR | $x \vee y = z$ | $S_\vee(x, y, z) \doteq \{x \leq z, y \leq z, z \leq x + y, z \leq 1\}$ |
| XOR | $x \oplus y = z$ | $S_\oplus(x, y, z) \doteq \{z \leq x + y, z \geq x - y, z \geq y - x, z \leq 2 - x - y\}$ |
| NOR | $\overline{x \vee y} = z$ | $S_{\overline{\vee}}(x, y, z) \doteq \{x \leq 1 - z, y \leq 1 - z, 1 - z \leq x + y, -z \leq 0\}$ |
| NAND | $\overline{x \wedge y} = z$ | $S_{\overline{\wedge}}(x, y, z) \doteq \{1 - z \leq x, 1 - z \leq y, -z \geq x + y - 2, 1 - z \geq 0\}$ |

The equivalence may be verified directly of the respective elementary operation and system of elementary inequalities. Systems $S_{\overline{\vee}}(x, y, z)$ and $S_{\overline{\wedge}}(x, y, z)$ may be derived from $S_\vee(x, y, z)$, $S_\wedge(x, y, z)$ by change of variable from z to 1−z. If variables x, y, z satisfy the corresponding system of elementary inequalities and x and y are binary-valued then z will be binary-valued as well.

a. Determining the Intermediate Relations

Having established the elementary relations corresponding to the elementary Boolean operations underlying the cryptographic operations, the respective intermediate relations are determined as follows.

c.1 Rijndael's Finite Field

Several cryptographic operations in AES are based on Rijndael's finite field, the Galois field $GF(2^8) = GF(2)[x]/(x^8 + x^4 + x^3 + x + 1)$. In AES, inverse operations and multiplications by 1, 2, and 3 are carried out in $GF(2^8)$. The calculation of the inverse operation is a hard problem in $GF(2^8)$, but an easy problem in $GF(2)$, where multiplication is carried out using AND operations. Therefore $1^{-1} = 1$ in $GF(2)$. Further $0^{-1}$ is defined as 0. These relations are valid for any $GF(2^P)$, $p \geq 1$. The inversion in $GF(2^8)$ may be sequentially reduced into multiplication and inversion in $GF(2^4)$, then $GF(2^2)$, and $GF(2)$ (cf. Canright, *Cryptographic Hardware and Embedded Systems*, CHES 2005, pp. 441-455). For example, an element G in $GF(2^8)$ can be represented as $G = \gamma_1 \gamma + \gamma_0$ with multiplication modulo an irreducible polynomial $r(y) = \gamma^2 + \tau \gamma + \nu$ and $\gamma_0, \gamma_1 \in GF(2^4)$. Similar transformations to $GF(2^2)$ and $GF(2)$ may be carried out. As a result, the inversion in $GF(2^8)$ can be represented by the Boolean elementary operations XOR, NAND, and NOR. As laid out above, the elementary operations are transformed into the corresponding elementary relations, cf. tables 1 and 2. For one byte/state entry, 180 elementary operations (XOR, NAND, NOR) are required. Each elementary operation requires one additional equation and two additional bits (z and a). The resulting intermediate equation for inversion, as determined from the elementary equations, is denoted with $E_{inv}(\vec{x}, \vec{a}, \vec{z})$ with (vector-valued) variables $\vec{x}$, $\vec{a}$, and $\vec{z}$.

Intermediate equations for the multiplication by 1, 2, and 3 in $GF(2^8)$ can be determined as follows. Multiplying by 1 simply yields the same number, i.e., $\alpha \times 1 = \alpha$ with $\alpha \in GF(2^8)$. Multiplying a number by 2 is equivalent to shifting the number left by one, and subsequently, if the highest bit of the number is one, additionally applying XOR to the result and the value 0x1B (in hexadecimal representation, corresponding to 00011011 in binary representation).

In particular, starting with $\vec{x}=[x_0, x_1, \ldots, x_7]$, shifting and applying XOR with 0x1B yields $\vec{z}=[z_0, z_1, \ldots, z_7]$. As 0x1B is constant, the XOR operation can be simplified using $\alpha \oplus 0 = \alpha$ and $\alpha \oplus 1 = \bar{\alpha}$. Hence, after shifting, the result is flipped if the highest bit of x and the corresponding bit of 0x1B are both equal to 1. Therefore, full multiplication by 2 results in the following equation system of intermediate equations:

$$E_2(\vec{x}, \vec{a}, \vec{z}) = \begin{cases} z_0 = x_7 \\ z_1 = x_7 + x_0 - 2a_0 \\ z_2 = x_1 \\ z_3 = x_7 + x_2 - 2a_1 \\ z_4 = x_7 + x_3 - 2a_2 \\ z_5 = x_4 \\ z_6 = x_5 \\ z_7 = x_6 \end{cases}$$

The intermediate equations with two variables correspond to substitution and can thus be eliminated. As a result, multiplication by 2 requires three additional equations and six additional bits.

Multiplication by 3 can be reformulated as follows:

$$x \times 3 = x \times (2 \oplus 1) = x \times 2 \oplus x \tag{10}$$

The employed XOR operation requires one additional equation and one additional auxiliary bit per state bit. Hence, multiplication by 3 requires 3+8=11 additional equations and 22 additional bits. The corresponding intermediate equations are denoted with $E_3(\vec{x}, \vec{a}, \vec{z})$.

c.2 AddRoundKey

In the AddRoundKey operation, the state is combined with a round key, which is determined from the cryptographic key for each round using the AES key schedule. Each round key has the same size as the state. The round key is added to the state by combining each byte of the state with the corresponding byte of the round key via bitwise XOR (see FIG. 3 for an illustration with exemplary byte values). For each of the 128 bits of the state and the round key, a bitwise XOR operation is applied. The AddRoundKey operation therefore requires 128 XOR operations corresponding to 128 additional equations and 256 additional bits.

Figure 3:
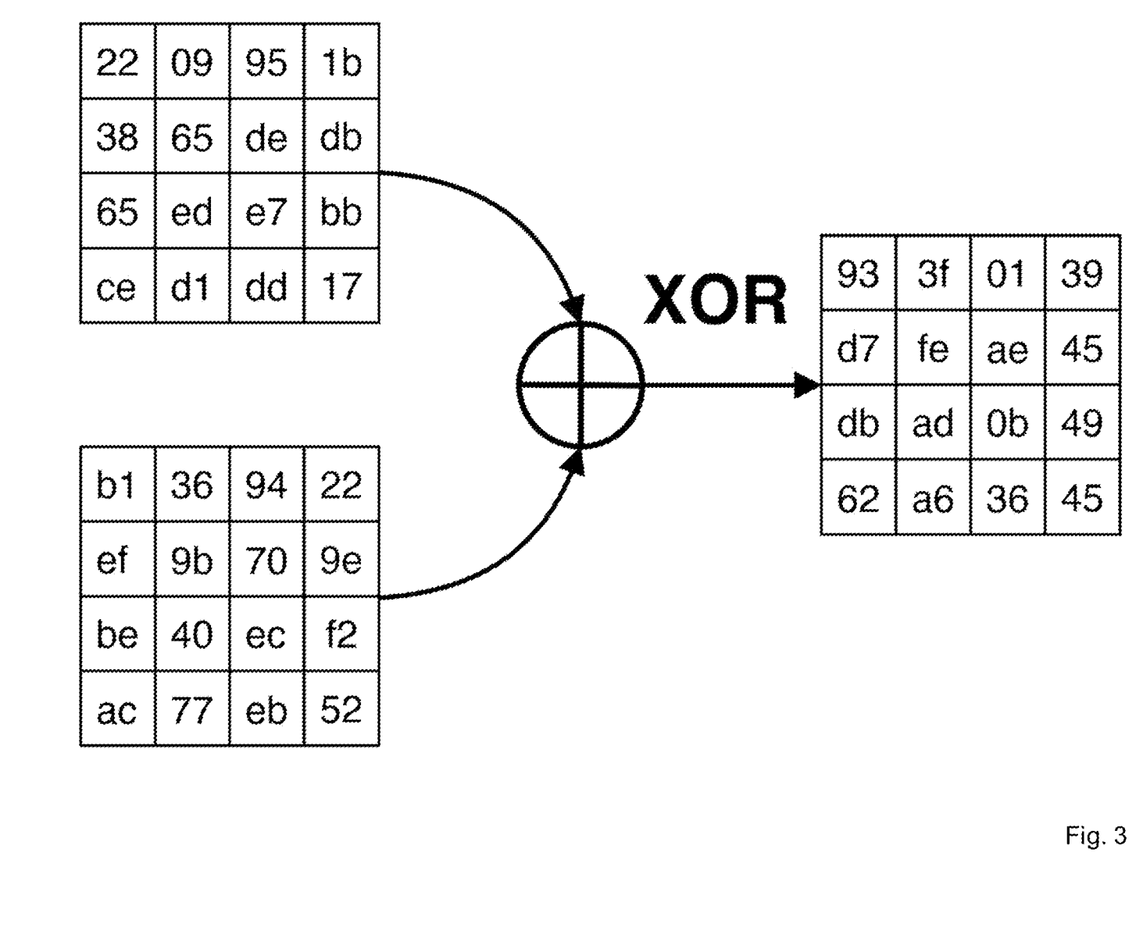
FIG. 3 shows a graphical representation of the AddRoundKey operation.

The intermediate equations $E_{addroundkey}(\vec{state}, \vec{subkey}, \vec{ancilla}, \vec{newstate})$ thus can be written as $$E_{addroundkey}(\vec{state}, \vec{subkey}, \vec{ancilla}, \vec{newstate}) = \{E_{\oplus}(state[i][j], subkey[i][j], ancilla[i][j], newstate[i][j]) \text{ for } i \text{ in } 0 \ldots 15 \text{ for } j \text{ in } 0 \ldots 7\} \tag{11}$$

c.3 SubBytes

Figure 4:
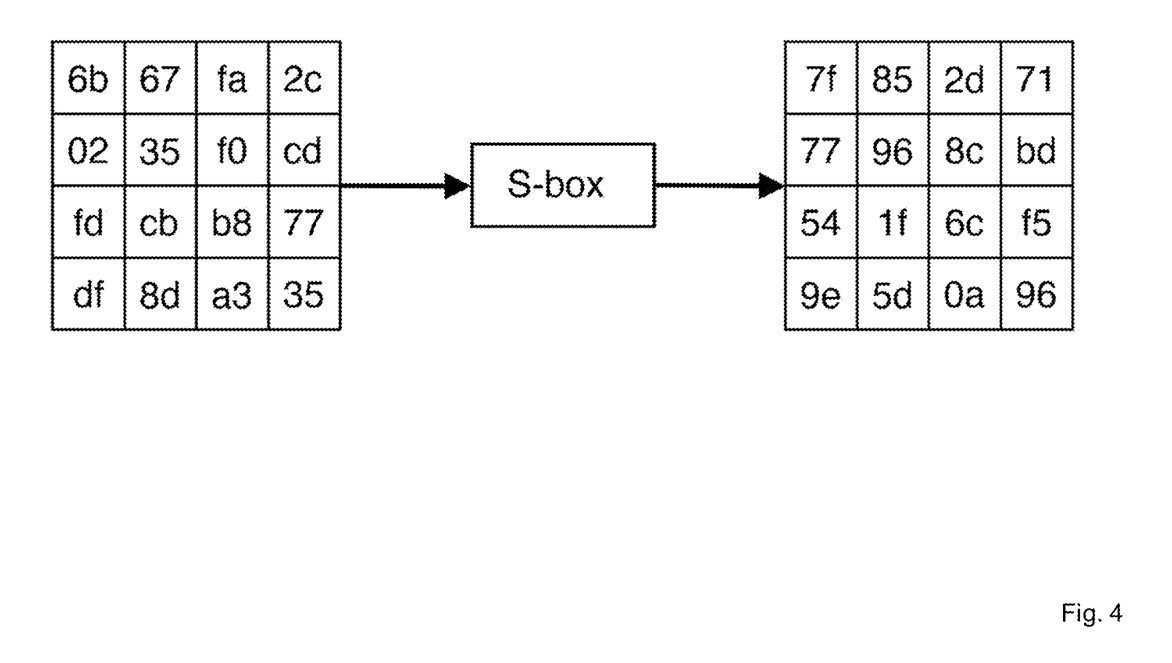
FIG. 4 shows a graphical representation of the SubBytes operation.

FIG. 4 shows graphical representation of the SubBytes operation. In the SubBytes operation, each byte $\alpha_{i,j}$ of the state is replaced with $S(\alpha_{i,j})$ using an 8-bit substitution box (S-box) S. This cryptographic operation provides non-linearity in the encryption procedure. The S-box used is derived from the multiplicative inverse over $GF(2^8)$, which comprises suitable non-linearity properties. The SubBytes operation can be decomposed into two parts.

First, each input byte is mapped to its multiplicative inverse in Rijndael's finite field $GF(2^8)$. Second, the following affine transformation is applied:

$$\begin{bmatrix} s_0 \\ s_1 \\ s_2 \\ s_3 \\ s_4 \\ s_5 \\ s_6 \\ s_7 \end{bmatrix} = \begin{bmatrix} 1 & 0 & 0 & 0 & 1 & 1 & 1 & 1 \\ 1 & 1 & 0 & 0 & 0 & 1 & 1 & 1 \\ 1 & 1 & 1 & 0 & 0 & 0 & 1 & 1 \\ 1 & 1 & 1 & 1 & 0 & 0 & 0 & 1 \\ 1 & 1 & 1 & 1 & 1 & 0 & 0 & 0 \\ 0 & 1 & 1 & 1 & 1 & 1 & 0 & 0 \\ 0 & 0 & 1 & 1 & 1 & 1 & 1 & 0 \\ 0 & 0 & 0 & 1 & 1 & 1 & 1 & 1 \end{bmatrix} \begin{bmatrix} b_0 \\ b_1 \\ b_2 \\ b_3 \\ b_4 \\ b_5 \\ b_6 \\ b_7 \end{bmatrix} \oplus \begin{bmatrix} 1 \\ 1 \\ 0 \\ 0 \\ 0 \\ 1 \\ 1 \\ 0 \end{bmatrix} \tag{12}$$

where $\vec{b}$ is the multiplicative inverse of the input byte.

Determining the multiplicative inverse can be carried out as described in section c.1. Thus, 180 additional equations and 360 bits for each byte are required, resulting in 16 · 180=360 additional linear equations and bits.

The affine transformation comprises an XOR operation with 5 input bits (corresponding to five matrix entries with value 1 per matrix row). The right-hand side vector does not have any variables. Hence, if its i-th bit has value zero, then $s_i$ is a flipped value (in the corresponding equation, $s_i$ is replaced by $1-s_i$). The XOR operation with 5 input values can be evaluated sequentially, i.e., $x_1 \oplus x_2 \oplus x_3 \oplus x_4 \oplus x_5 = (((x_1 \oplus x_2) \oplus x_3) \oplus x_4) \oplus x_5$. This requires several additional auxiliary variables.

In an alternative approach, an intermediate optimization problem is determined and solved as detailed above with respect to the elementary optimization problems. The optimization problem yields the following intermediate equation:

$$E_{s\oplus} \doteq \{x_1+x_2-x_3+x_4-x_5-y+2\alpha_0-2\alpha_1=0\} \tag{13}$$

Hence, each bit of the cryptographic operation SubBytes requires one equation and three auxiliary bits. For the entire state, 128 equations and 384 auxiliary bits are required. In total, the SubBytes operation requires 2880+128=3008 (intermediate) equations and 5760+384=6144 auxiliary bits.

For the cryptographic operation SubBytes, the following intermediate equations are thus provided:

$$E_{subbytes}(\vec{state}, \vec{ancilla}, \vec{nextstate}) = \begin{cases} E_{inv}(\vec{state}[0], \vec{ancilla}[0][0], \vec{invstate}[0]) \\ E_{5\oplus}(\vec{invstate}[0], \vec{ancilla}[0][1][i], \vec{nextstate}[0][i]) \text{ for } i \text{ in } 0..7 \\ \ldots \\ E_{inv}(\vec{state}[15], \vec{ancilla}[15][0], \vec{invstate}[15]) \\ E_{5\oplus}(\vec{invstate}[15], \vec{ancilla}[15][1][i], \vec{nextstate}[15][i]) \text{ for } i \text{ in } 0..7 \end{cases} \tag{14}$$

c.4 ShiftRows

The ShiftRows operation acts on the rows of the state by cyclically shifting the bytes in each row by a certain offset. For AES, the first row is left unchanged. Each byte of the second row is shifted one to the left. Similarly, the third and fourth rows are shifted by offsets of two and three, respectively. Hence, the ShiftRows operation just rearranges bits and does not require additional linear equations with auxiliary variables.

The corresponding intermediate relation therefore comprises a permutation function $$S(\vec{state}) = \vec{newstate}, \tag{15}$$

which represents the bit rearrangements.

c.5 MixColumns

Figure 5:
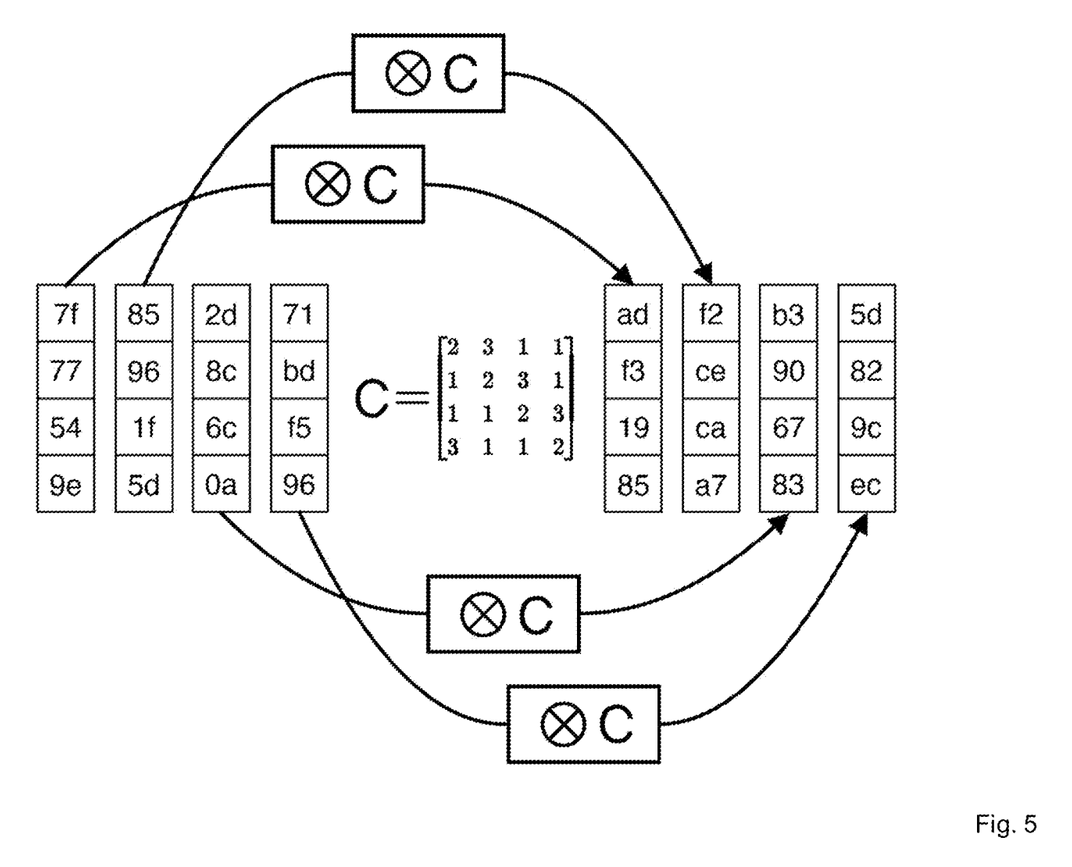
FIG. 5 shows a graphical representation of the MixColumns operation.

FIG. 5 shows a graphical representation of the MixColumns operation, by which the four bytes of each column of the state are combined using an invertible linear transformation. Each column j is transformed using a fixed matrix by left-multiplying the fixed matrix with the column j:

$$\begin{bmatrix} b_{0,j} \\ b_{1,j} \\ b_{2,j} \\ b_{3,j} \end{bmatrix} = \begin{bmatrix} 2 & 3 & 1 & 1 \\ 1 & 2 & 3 & 1 \\ 1 & 1 & 2 & 3 \\ 3 & 1 & 1 & 2 \end{bmatrix} \begin{bmatrix} a_{0,j} \\ a_{1,j} \\ a_{2,j} \\ a_{3,j} \end{bmatrix} \quad 0 \le j \le 3 \quad (16)$$

Multiplication and addition are carried out in the Galois field $GF(2^8)$. Addition in $GF(2^8)$ corresponds to the XOR operation. Using four input bits for each output bit $b_{i,j}$ (i=0, ... 3), the corresponding intermediate equation reads:

$$x_1 + x_2 - x_3 + x_4 + y - 2a_0 - 2a_1 = 0 \quad (17)$$

Hence, addition in $GF(2^8)$ requires one additional equation and 3 auxiliary bits per state bit, resulting in 128 additional equations and 384 auxiliary bits per state in total. Multiplication by 2 requires three equations and six auxiliary bits per byte and 48 equations and 96 bits per state, while multiplication by 3 requires 176 equations and 352 auxiliary bits per state. In total, the MixColumns operation requires 128+48+176=352 intermediate equations and 384+96+352=832 auxiliary bits.

Denoting the MixColumns input state with $\overrightarrow{state} = \{a_{i,j}$ for i in 0 ... 3 for j in 0 ... 3} and the output state with $\overrightarrow{newstate} = \{a_{i,j}$ for i in 0 ... 3 for j in 0 ... 3}, the intermediate equations for the MixColumns operation read:

$$E_{mixcolumns}(\overrightarrow{state}, \overrightarrow{ancilla}, \overrightarrow{newstate}) = \quad (18)$$

$$\{E_2(a_{i,j}, ancilla_{i,j,2}, aa_{i,j}), E_3(a_{i,j}, ancilla_{i,j,3}, aaa_{i,j}),$$

$$E_{4\oplus}(aa_{0,j}, aaa_{1,j}, a_{2,j}, a_{3,j}, ancilla_{0,j}, ancilla_{1,j}, b_{0,j}),$$

$$E_{4\oplus}(a_{0,j}, aa_{1,j}, aaa_{2,j}, a_{3,j}, ancilla_{0,j}, ancilla_{1,j}, b_{1,j}),$$

$$E_{4\oplus}(a_{0,j}, a_{1,j}, aa_{2,j}, aaa_{3,j}, ancilla_{0,j}, ancilla_{1,j}, b_{2,j}),$$

$$E_{4\oplus}(aaa_{0,j}, a_{1,j}, a_{2,j}, aa_{3,j}, ancilla_{0,j}, ancilla_{1,j}, b_{3,j}),$$

for i in 0 ... 3, for j in 0 ... 3} c.6 KeyExpansion

Figure 6:
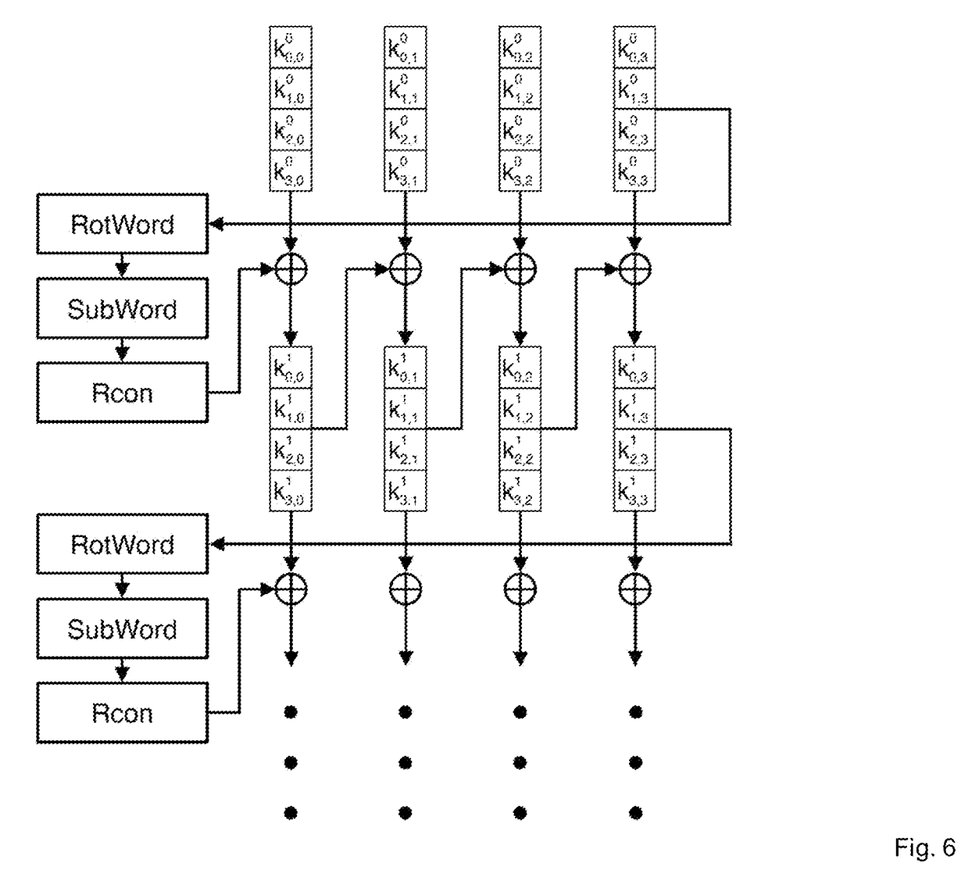
FIG. 6 shows a graphical representation of the KeyExpansion operation.

FIG. 6 shows a graphical representation of the KeyExpansion operation, which expands the cryptographic key into a plurality of separate round keys. The three AES variants AES-128, AES-192, and AES-256 (with the cryptographic key having 128, 192, and 256 bits, respectively) comprise different numbers of rounds. Each AES variant requires a separate 128-bit round key for each round plus an additional round. The AES key schedule produces the round keys from the cryptographic key. Denoting the number of 32-bits words in the cryptographic key with N (i.e., N=4 for AES-128, N=6 for AES-192, and N=8 for AES-256), the cryptographic key with $[K_0, K_1, \ldots, K_{N-1}]$, the number of rounds plus one with R (i.e., R=11 for AES-128, R=13 for AES-192, and R=15 for AES-256), and the 32-bit words of the expanded key with $W_0, W_1, \ldots, W_{4R-1}$, the round key at round r (with r<R) is $[W_{4r}, W_{4r+1}, W_{4r+2}, W_{4r+3}]$. The 32-bit words $W_i$ for each round key are determined as follows:

$$W_i = \begin{cases} K_i & \text{if } i < N \\ W_{i-N} \oplus SubWord(RotWord(W_{i-1})) \oplus rcon_{i/N} & \text{if } i \ge N \text{ and } i \equiv 0 (\bmod N) \\ W_{i-N} \oplus SubWord(W_{i-1}) & \text{if } i \ge N, N > 6, \text{ and } i \equiv 4 (\bmod N) \\ W_{i-N} \oplus W_{i-1} & \text{otherwise} \end{cases} \quad (19)$$

The operation RotWord corresponds to a one-byte left circular shift and does not require additional linear equations as it just rearranges state bits. The operation SubWord represents an application of the AES S-box as described in Section c.3 to each of the four bytes of the word:

$$SubWord([b_0 b_1 b_2 b_3]) = [S(b_0) S(b_1) S(b_2) S(b_3)]. \quad (20)$$

Further, rcon is an array of given numbers. Therefore, applying XOR does not involve additional linear equations and auxiliary bits. Both operations $W_{i-N} \oplus SubWord(RotWord(W_{i-1})) \oplus rcon_{i/N}$ and $W_{i-N} \oplus SubWord(W_{i-1})$ are equivalent in terms of additional equations and auxiliary bits. Hence, the 32-bit words $W_i$ of the round key are calculated using three different operations:

I. $W_i$ is determined as $K_i$, which is just part of the cryptographic key. Hence, no additional equations and only 32 bits are required (each $K_i$ has a bit length of 32). This type of operation is carried out N times.

II. $W_i$ is determined as $W_{i-N} \oplus SubWord(RotWord(W_{i-1})) \oplus rcon_{i/N}$ or as $W_{i-N} \oplus SubWord(W_{i-1})$. The corresponding S-box requires 188 equations and 384 auxiliary bits per byte. With 4 bytes and additional XOR, in total 188·4+8=760 equations and 384·4+2·8=1552 auxiliary bits are required. This type of operation is carried out 10 times for AES-128, 8 times for AES-192 and 13 times for AES-256.

III. $W_i$ is determined as $W_{i-N} \oplus W_{i-1}$, which corresponds to XOR acting on a 32-bit word, thus requiring 32 equations and auxiliary 64 bits. This type of operation is carried out 30 times for AES-128, 38 times for AES-192 and 39 times for AES-256.

In total, the KeyExpansion operation requires 8560 intermediate equations and 17568 auxiliary bits for AES-128, 7296 intermediate equations and 15040 auxiliary bits for AES-192, and 11128 intermediate equations and 22928 auxiliary bits for AES-256.

The intermediate equations corresponding to the KeyExpansion operation are denoted with $E_{keyexpansion}(\overrightarrow{K}, \overrightarrow{ancilla}, \overrightarrow{W})$.

c.7 Obtaining the Intermediate Inequalities Via Convex Polyhedron Representations The intermediate inequalities for the respective cryptographic procedures can also be determined by making use of the fact that any Boolean function $F(\vec{x})$ can be represented as a system of linear inequalities. For a set $B^n \doteq \{x_1, x_2, \ldots, x_n): x_k \in \{0,1\}\} \subset \mathbb{R}^n$ of all vertices of an n-dimensional unit cube, which corresponds to the set of all 0-1 arguments of the Boolean function $F: B^n \to \{0,1\}$, there exists a system of linear inequalities with n+1 variables ($\vec{x}, x_{n+1}$)

$$S(\vec{x}, x_{n+1}) = \{a_i + l_i(\vec{x}) + b_i x_{n+1} \geq 0 : i=1, \ldots, m\}, \quad (21)$$

(wherein $a_i$, $b_i$, $b_i \neq 0$ are scalars, and $l_i(\vec{x})$ are linear functions of n variables) such that the following holds:

$$\forall \vec{x} \in B^n : \{F(\vec{x}) = x_{n+1}\} \Leftrightarrow \{a_i + l_i(\vec{x}) + b_i x_{n+1} \geq 0 : i=1, \ldots, m\} \quad (22)$$

I.e., for any $\vec{x} \in B^n$, $F(\vec{x}) = x_{n+1}$ if and only if $S(\vec{x}, x_{n+1})$ holds. Importantly, it is not required to assume $x_{n+1}$ to be a binary-values variable. For any binary-valued vector $\vec{x}$, the system $S(\vec{x}, x_{n+1})$ has only a solution $(\vec{x}, x_{n+1})$ where $x_{n+1} = F(\vec{x})$.

Transforming Boolean functions to linear equations or inequalities is a known challenge in computing science, in particular with regard to connections between the Boolean satisfiability (SAT) problem and integer linear programming (ILP) problems. Treating the SAT-problem corresponds to checking the satisfiability of a large Boolean function that is represented mainly in one of two special forms: CNF (conjunctive normal form) or DNF (disjunctive normal form). If a Boolean function has DNF or CNF representation, then the generation of corresponding linear inequalities may be done directly on the base of Table 2 since DNF and CNF representations are compositions of elementary bi-variant Boolean operations. This (first) approach may be applied to any Boolean functions because any Boolean function may be converted to a DNF or CNF representation.

Such an approach may have two drawbacks: First, a corresponding CNF or DNF representation has to be determined for a given Boolean function and, second, the system of linear inequalities to be generated may comprise a substantial amount of redundant inequalities.

In an alternative second approach, DNF or CNF representations are not required, and irreducible systems of linear inequalities may be obtained. Any Boolean function F of n variable can be represented by a convex hull of appropriate $2^n$ vertices of the unit hypercube $B^{n+1} \subset \mathbb{R}^{n+1}$. The Boolean function F may be represented by a set of vectors in $\mathbb{R}^{n+1}$ $V[F] \doteq \{(\vec{x}, F(x)): \vec{x} \in B^n\}$, which can be understood as a graph of the Boolean function F. V[F] is a subset of the unit hypercube, i.e., $V[F] \subset B^{n+1}$. It can be shown that all vectors in V[F] are vertices of the corresponding convex polyhedron conv(V[F]), a convex hull of V[F]. Therefore, the Boolean function F may be treated as a convex polyhedron V[F] (using the same symbol for polyhedron and the set of its vertices). Any polyhedron may be represented either by the set of all its vertices, the V-representation, or by the system of linear inequalities (corresponding to the set of the facets of the polyhedron), the H-representation (cf. Avis and Fukuda, Discrete & Computational Geometry, 8(3):295-313, 1992). The H-representation of the polyhedron V[F] (given by V-representation) represents the sought-after system of linear inequalities.

V- and H-representations of convex hulls of finite set of points in Euclidean spaces may e.g., be determined via polyhedral computation codes such as CDD or LRS. Notably, irreducible H-representations can be produced, i.e., redundant linear inequalities are eliminated. Thus, the complexity of the resulting optimization problem for determining the cryptographic key can be reduced. LRS further allows for a parallel implementation of reverse search algorithms. Moreover, in LRS computations regarding polyhedra with integral-valued vertices (as is the case with V[F]) may be carried out without loss of accuracy.

All linear systems for elementary Boolean bi-variant functions listed in Table 2 may be obtained via determining a corresponding H-representation. As an example, for the Boolean function J with $$J(x_1, x_2, x_3) = (x_1 \wedge x_2) \vee (x_1 \wedge x_3) \vee (x_2 \wedge x_3) = x_4, \quad (23)$$

systems of inequalities as MILP constraints are determined using both the first and the second approach.

Determining the H-representation (e.g., with LRS) yields a system with 10 inequalities, $$\begin{bmatrix} 1 \\ 0 \\ 1 \\ 1 \\ 1 \\ 0 \\ 1 \\ 0 \\ 0 \\ 0 \end{bmatrix} + \begin{bmatrix} 0 & 0 & 0 & -1 \\ 0 & 0 & 0 & 1 \\ -1 & -1 & 0 & 1 \\ -1 & -1 & -1 & 2 \\ 0 & -1 & -1 & 1 \\ 1 & 0 & 1 & -1 \\ -1 & 0 & -1 & 1 \\ 1 & 1 & 0 & -1 \\ 0 & 1 & 1 & -1 \\ 1 & 1 & 1 & -2 \end{bmatrix} \begin{bmatrix} x_1 \\ x_2 \\ x_3 \\ x_4 \end{bmatrix} \geq \vec{[0]} \quad (24)$$

while using the first approach with DNF/CNF representation, a system of 17 inequalities and 4 continuous ancillaries is established. The larger number in the latter case results from the successive construction of the system from elementary bi-variant Boolean functions and continuous ancillary variables, while the former approach allows for treating the Boolean function J as a whole.

In a second example, a Boolean expression comprising 5 binary variables $x_1$, $x_2$, $x_3$, x4, $x_5$, $x_6$ and $$x_1 \oplus x_2 \oplus x_3 \oplus x_4 \oplus x_5 = x_6, \quad (25)$$

is equivalent to the following system of linear inequalities:

$$\begin{bmatrix}1\\0\\4\\4\\4\\4\\4\\2\\2\\2\\0\\0\\0\\0\\0\\0\\2\\2\\2\\2\\2\\2\\2\\2\\2\\2\\2\\2\\2\\2\\4\\2\\2\\2\\2\end{bmatrix} + \begin{bmatrix}0 & 0 & 0 & 0 & 0 & -1\\0 & 0 & 0 & 0 & 0 & 1\\-1 & -1 & -1 & -1 & -1 & 1\\-1 & -1 & -1 & -1 & 1 & -1\\-1 & 1 & -1 & -1 & -1 & -1\\1 & -1 & -1 & -1 & -1 & -1\\-1 & -1 & 1 & -1 & -1 & -1\\1 & -1 & -1 & 1 & 1 & -1\\-1 & 1 & -1 & 1 & 1 & -1\\1 & 1 & -1 & -1 & -1 & 1\\1 & -1 & 1 & 1 & 1 & 1\\1 & 1 & 1 & 1 & 1 & -1\\1 & 1 & 1 & 1 & -1 & 1\\1 & 1 & 1 & -1 & 1 & 1\\1 & 1 & -1 & 1 & 1 & 1\\-1 & 1 & 1 & 1 & 1 & 1\\1 & 1 & 1 & -1 & -1 & -1\\1 & 1 & -1 & -1 & 1 & -1\\1 & 1 & -1 & 1 & -1 & -1\\1 & -1 & 1 & 1 & -1 & -1\\-1 & 1 & 1 & 1 & -1 & -1\\-1 & -1 & 1 & 1 & 1 & -1\\1 & -1 & 1 & -1 & 1 & -1\\-1 & 1 & 1 & -1 & 1 & -1\\-1 & 1 & 1 & -1 & -1 & 1\\1 & -1 & 1 & -1 & -1 & 1\\-1 & 1 & -1 & -1 & 1 & 1\\1 & -1 & -1 & -1 & 1 & 1\\-1 & -1 & 1 & -1 & 1 & 1\\-1 & -1 & -1 & 1 & -1 & -1\\-1 & 1 & -1 & 1 & -1 & 1\\1 & -1 & -1 & 1 & -1 & 1\\-1 & -1 & 1 & 1 & -1 & 1\\-1 & -1 & -1 & 1 & 1 & 1\end{bmatrix} \begin{bmatrix}x_1\\x_2\\x_3\\x_4\\x_5\\x_6\end{bmatrix} \geq \vec{[0]}$$

(26)

Since $x_1$, $x_2$, $x_3$, $x_4$, $x_5$ are all binary-valued, redundant trivial inequalities ($0 \leq x_1 \leq 1$) could be excluded as well as inequalities with zero coefficients for the variable $x_6$. The output value $x_6$ will automatically be binary.

a. Determining the Optimization Problem

Having established all intermediate relations, the optimization problem to be solved can be determined. Table 3 shows the number of employed intermediate equations and auxiliary bits.

TABLE 3

| | Number of intermediate equations | Auxiliary bits |
|---|---|---|
| AES-128 | 43216 | 89312 |
| AES-192 | 2 · 48928 | 2 · 101248 |
| AES-256 | 2 · 59736 | 2 · 123600 |

The optimization expressions of the optimization problem are determined from the set of intermediate relations, in case of intermediate equations from $$\begin{cases} E_{keyexpansion}\left(\vec{K}, \overrightarrow{ancilla_{key}}, \vec{W}\right) \\ E_{addroundkey}\left(\overrightarrow{initstate}, \overrightarrow{W_0 W_1 W_2 W_3}, \overrightarrow{ancilla_{add0}}, \overrightarrow{state_0}\right) \\ E_{subbytes}\left(\overrightarrow{state_0}, \overrightarrow{ancilla_{sub0}}, \overrightarrow{boxstate_0}\right) \\ E_{mixcolumns}\left(\overrightarrow{S(boxstate_0)}, \overrightarrow{ancilla_{mix0}}, \overrightarrow{mixstate_0}\right) \\ E_{addroundkey}\left(\overrightarrow{mixstate_0}, \overrightarrow{W_4 W_5 W_6 W_7}, \overrightarrow{ancilla_{add1}}, \overrightarrow{state_1}\right) \\ \vdots \\ E_{subbytes}\left(\overrightarrow{state_{R-2}}, \overrightarrow{ancilla_{subR-2}}, \overrightarrow{boxstate_{R-2}}\right) \\ E_{mixcolumns}\left(\overrightarrow{S(boxstate_{R-2})}, \overrightarrow{ancilla_{mixR-2}}, \overrightarrow{mixstate_{R-2}}\right) \\ E_{addroundkey}\left(\overrightarrow{mixstate_{R-2}}, \overrightarrow{W_{4(R-2)} W_{4(R-2)+1} W_{4(R-2)+2} W_{4(R-2)+3}}, \overrightarrow{ancilla_{addR-1}}, \overrightarrow{state_{R-1}}\right) \\ E_{subbytes}\left(\overrightarrow{state_{R-1}}, \overrightarrow{ancilla_{subR-1}}, \overrightarrow{boxstate_{R-1}}\right) \\ E_{addroundkey}\left(\overrightarrow{mixstate_{R-1}}, \overrightarrow{W_{4(R-1)} W_{4(R-1)+1} W_{4(R-1)+2} W_{4(R-1)+3}}, \overrightarrow{ancilla_{addR}}, \overrightarrow{state_R}\right) \end{cases}$$

(27)

where $\overrightarrow{\text{initstate}}$ corresponds to the plaintext, $\overrightarrow{\text{state}}_R$ corresponds to the ciphertext and $\overrightarrow{K}$ denotes the cryptographic key variable. The cryptographic key is determined from an optimizing value of the cryptographic key variable $\overrightarrow{K}$. The state variables $\overrightarrow{\text{state}}_r$ correspond to the states of the AES procedure for different rounds r. Notably, several optimization expressions each comprise at least one preceding state variable assigned to a preceding round, in particular a directly preceding round. e.g., the optimization expression $E_{subbytes}(\overrightarrow{\text{state}}_{R-2}, \overrightarrow{\text{ancilla}}_{subR-2}, \overrightarrow{\text{boxstate}}_{R-2})$ comprises the state variable $\overrightarrow{\text{state}}_{R-2}$ assigned to the preceding round R-2.

For the optimization problem being a MILP, the optimization expressions are optimization constraints. Hence, the intermediate equations in Eq. (27) constitute the constraints of a MILP. A MILP can also be determined with the optimization expressions as constraints being the intermediate inequalities instead of the intermediate equations. To this end, the corresponding inequalities for each cryptographic operation and round have to be determined.

For the optimization problem being a QUBO problem, the optimization expressions are determined from the intermediate equations by moving all terms of each intermediate equation to one side and squaring the resulting terms. The objective function of the QUBO problem then comprises a sum of all squared terms. Determining the optimization expressions this way can be formally described as follows. Representing the intermediate equations as a linear system $$A\vec{x}=\vec{b}, \tag{28}$$

where $\vec{x} \in \{0,1\}^N$, $A \in \mathbb{R}^{N \times N}$, $\vec{b} \in \mathbb{R}^N$ and $a_{ij}$ is the matrix entry of the matrix A in the i-th row and the j-th column, the linear system in Eq. (28) is equivalent to:

$$\begin{cases} \sum_j a_{0j}x_j - b_0 = 0 \\ \sum_j a_{1j}x_j - b_1 = 0 \\ \vdots \\ \sum_j a_{N-1,j}x_j - b_{N-1} = 0 \end{cases} \tag{29}$$

Summing up the left-hand sides of Eq. (29) yields the objective function $$\min((\Sigma_j a_{0j}x_j - b_0)^2 + (\Sigma_j a_{1j}x_j - b_1)^2 + \ldots + (\Sigma_j a_{N-1,j}x_j - b_{N-1})^2). \tag{30}$$

The minimum of the objective function in Eq. (30) is reached if and only if x is a solution of the linear systems in Eqs. (28), (29).

Both equation representation and inequality representation may be used for determining MILPs.

In case of using equations, each Boolean function of the cryptographic procedures may be reduced to a single equation with binary ancillaries. A CPLEX-solver may be used to obtain coefficients of the equation. Using intermediate equations with binary ancillaries/auxiliary variables further allows for determining QUBOs specifically suited for Quantum Annealers.

Both MILP and QUBO problems may also in principle be solved by classical generic solvers such as CPLEX, Gurobi, SCIP, or CBC. However, the additional binary ancillaries may substantially increase the computing complexity, posing a challenge for classical solvers. In this regard, QUBO problems may considered to be more promising since they may be solved by a quantum annealing device such as D-Wave.

In case of inequalities without binary ancillaries, each Boolean function is reduced to a system of linear inequalities without any additional binary variables. The inequalities may explicitly be determined using polyhedra applications such as LRS. This approach is mainly, but not exclusively, suitable for classical solvers.

AES variants may use cryptographic keys which are longer than plaintext (AES-256 has 256 bits for the cryptographic key and 128 bits for the plaintext). Therefore, one plaintext block with 128 bits and its ciphertext are not sufficient to determine the full cryptographic key. However, two known plaintext blocks of 128 bits each (together with their corresponding ciphertexts) comprise sufficient information.

In order to treat the variants AES-192 and AES-256, two copies of the plurality/system of intermediate relations (equations or inequalities) are determined. A first system comprises a first plaintext and a first ciphertext generated from the first plaintext using the cryptographic key, and a second system comprises a second plaintext and a second ciphertext generated from the second plaintext using the (same) cryptographic key. The first and the second system can also be considered forming a (total) system of intermediate relations. From the first and the second system, a common optimization problem is determined and solved analogously to the case of AES-128.

The described method steps are not only suitable for AES, but also for other cryptographic procedures. Any cryptographic procedure which comprises a defined protocol and non-linear functions and which either has a limited amount of inputs bits or can be decomposed into the elementary operations XOR, AND etc. can be approached as well. Namely, the method can be adapted for IDEA, Salsa20, or ARX.

The features disclosed in this specification, the figures and/or the claims may be material for the realization of various embodiments, taken in isolation or in various combinations thereof.

The invention claimed is:

1. A method for determining a cryptographic key, the method being carried out in a data processing system, the method comprising:
providing a plaintext and a ciphertext determined from the plaintext using the cryptographic key and a cryptographic procedure which comprises cryptographic operations;
for each cryptographic operation of the cryptographic procedure, providing at least one intermediate relation which comprises an intermediate equation and/or an intermediate inequality;
determining an optimization problem comprising
the plaintext and the ciphertext,
at least one optimization expression assigned to a round of the cryptographic procedure, and
optimization variables comprising state variables of the cryptographic procedure and a cryptographic key variable,
wherein the at least one optimization expression is determined from the at least one intermediate relation and comprises at least one preceding state variable assigned to a preceding round; and
solving the optimization problem and determining the cryptographic key from an optimizing value of the cryptographic key variable, wherein the optimization problem is at least partially solved in a quantum processing device of the data processing system.

2. The method according to claim 1, wherein the cryptographic procedure is described in terms of Boolean functions on binary variables and/or is one of AES, IDEA, Salsa20, DES, 3-DES, and an ARX procedure.

3. The method according to claim 1, wherein the cryptographic operations comprise AES operations, preferably at least one of AddRoundKey, SubBytes, ShiftRows, MixColumns, and KeyExpansion.

4. The method according to claim 1, further comprising:
determining an elementary operation of at least one of the cryptographic operations;
from the elementary operation, determining an elementary relation comprising an elementary equation and/or an elementary inequality; and
determining at least one intermediate relation from the elementary relation,
wherein, preferably, the elementary operation is one of NOT, AND, OR, and XOR.

5. The method according to claim 4, wherein at least one elementary relation is determined by solving an elementary optimization problem, preferably an unconstrained quadratic problem.

6. The method according to claim 1, wherein at least one intermediate relation is provided by solving an intermediate optimization problem and/or corresponds to a Boolean function with more than one elementary operation.

7. The method according to claim 1, wherein at least one intermediate relation is provided by determining an H-representation of a convex polyhedron for one of the cryptographic operations.

8. The method according to claim 1, wherein at least one intermediate relation is provided by determining, for one of the cryptographic operations acting on a finite field, a further operation acting on a further finite field of lower order.

9. The method according to claim 1, wherein the optimization problem is a mixed-integer linear program, a mixed-integer nonlinear program, or a quadratic unconstrained binary optimization problem.

10. The method according to claim 1, wherein the optimization expression is an optimization constraint, or is contained in an objective function of the optimization problem.

11. The method according to claim 1, wherein the plaintext comprises a first plaintext and a second plaintext, and the ciphertext comprises a first ciphertext and a second ciphertext, wherein the first ciphertext has been determined from the first plaintext using the cryptographic key and the cryptographic procedure, and the second ciphertext has been determined from the second plaintext using the cryptographic key and the cryptographic procedure.

12. The method according to claim 1, wherein the quantum processing device of the data processing system is a quantum annealing device.

13. The method according to claim 12, wherein the optimization variables are assigned to a superposition of quantum states.

14. A data processing system that includes a processor and a memory associated with the processor, the processor and the memory operating and configured to determine a cryptographic key by:
providing a plaintext and a ciphertext determined from the plaintext using the cryptographic key and a cryptographic procedure which comprises cryptographic operations;
for each cryptographic operation of the cryptographic procedure, providing at least one intermediate relation which comprises an intermediate equation and/or an intermediate inequality;
determining an optimization problem comprising
the plaintext and the ciphertext,
at least one optimization expression assigned to a round of the cryptographic procedure, and
optimization variables comprising state variables of the cryptographic procedure and a cryptographic key variable,
wherein the at least one optimization expression is determined from the at least one intermediate relation and comprises at least one preceding state variable assigned to a preceding round; and
solving the optimization problem and determining the cryptographic key from an optimizing value of the cryptographic key variable, wherein the optimization problem is at least partially solved in a quantum processing device of the data processing system.

* * * * *